US008524836B2

(12) United States Patent
Kavanagh et al.

(10) Patent No.: US 8,524,836 B2
(45) Date of Patent: Sep. 3, 2013

(54) CROSSLINKABLE ACRYLATE ADHESIVE POLYMER COMPOSITION

(71) Applicant: 3M Innovative Properties Company, St. Paul, MN (US)

(72) Inventors: Maureen A. Kavanagh, Stanchfield, MN (US); Belma Erdogan-Haug, St. Paul, MN (US); Larry R. Krepski, White Bear Lake, MN (US); Peiwang Zhu, Woodbury, MN (US); Babu N. Gaddam, Woodbury, MN (US); Dang Xie, Shanghai (CN); Wen Jie Zhang, Shanghai (CN); Qing Wu, Shanghai (CN)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 13/762,868

(22) Filed: Feb. 8, 2013

(65) Prior Publication Data
US 2013/0150478 A1 Jun. 13, 2013

Related U.S. Application Data

(62) Division of application No. 12/849,887, filed on Aug. 4, 2010, now abandoned.

(30) Foreign Application Priority Data

Jan. 20, 2010 (CN) .......................... 2010 1 0004903

(51) Int. Cl.
C08F 8/32 (2006.01)
(52) U.S. Cl.
USPC .......... 525/329.9; 525/194; 525/375; 525/72; 525/301; 156/332; 427/207.1; 427/208.4
(58) Field of Classification Search
USPC ........ 525/194, 375, 329.9, 72, 301; 156/332; 427/207.1, 208.4
See application file for complete search history.

(56) References Cited

U.S. PATENT DOCUMENTS

| | | |
|---|---|---|
| RE24,906 E | 12/1960 | Ulrich |
| 3,243,429 A | 3/1966 | Ham |
| 3,337,533 A | 8/1967 | Ham |
| 3,511,897 A | 5/1970 | Endsley |
| 3,691,140 A | 9/1972 | Silver |
| 4,026,880 A | 5/1977 | Mitchell |
| 4,062,886 A | 12/1977 | Turner |
| 4,166,152 A | 8/1979 | Baker et al. |
| 4,181,752 A | 1/1980 | Martens et al. |
| 4,225,665 A | 9/1980 | Schadt, III |
| 4,243,500 A | 1/1981 | Glennon |
| 4,303,485 A | 12/1981 | Levens |
| 4,304,705 A | 12/1981 | Heilmann et al. |
| 4,329,383 A | 5/1982 | Joh |
| 4,330,590 A | 5/1982 | Vesley |
| 4,364,972 A | 12/1982 | Moon |
| 4,391,687 A | 7/1983 | Vesley |
| 4,605,698 A | 8/1986 | Briden |
| 4,619,979 A | 10/1986 | Kotnour et al. |
| 4,636,432 A | 1/1987 | Shibano et al. |
| 4,656,218 A | 4/1987 | Kinoshita |
| 4,777,276 A | 10/1988 | Rasmussen et al. |
| 4,843,134 A | 6/1989 | Kotnour et al. |
| 5,045,569 A | 9/1991 | Delgado |
| 5,506,279 A | 4/1996 | Babu et al. |
| 5,532,112 A | 7/1996 | Kohler et al. |
| 5,648,425 A * | 7/1997 | Everaerts et al. ............. 525/100 |
| 5,741,543 A | 4/1998 | Winslow et al. |
| 5,753,768 A | 5/1998 | Ellis |
| 5,773,485 A | 6/1998 | Bennett et al. |
| 5,902,836 A | 5/1999 | Bennett et al. |
| 6,245,922 B1 | 6/2001 | Heilmann et al. |
| 6,294,249 B1 | 9/2001 | Hamer et al. |
| 6,448,301 B1 | 9/2002 | Gaddam et al. |
| 6,521,682 B1 | 2/2003 | Costantino et al. |
| 6,677,413 B1 | 1/2004 | Lewandowski et al. |
| 6,734,256 B1 | 5/2004 | Everaerts et al. |
| 6,879,718 B2 | 4/2005 | Hullender |
| 6,893,718 B2 | 5/2005 | Melancon et al. |
| 6,893,719 B1 | 5/2005 | Nakajima et al. |
| 7,276,247 B2 | 10/2007 | Fansler et al. |
| 7,339,002 B2 | 3/2008 | Guo et al. |
| 7,385,020 B2 | 6/2008 | Anderson et al. |
| 7,393,901 B1 | 7/2008 | Filiatrault et al. |
| 7,459,489 B2 | 12/2008 | Lewandowski et al. |
| 7,612,122 B2 | 11/2009 | Herlihy et al. |

(Continued)

FOREIGN PATENT DOCUMENTS

| | | |
|---|---|---|
| DE | 2630784 | 2/1977 |
| DE | 4447615 | 7/1996 |

(Continued)

OTHER PUBLICATIONS

Pocius, "Adhesion and Adhesives Technology, An Introduction", (2002), $2^{nd}$ Edition, Hanser Gardner Publications, Inc., Cincinnati, OH.
PSTC-7, "Holding Power of Pressure Sensitive Tape", Revised (1989), pp. 37-39.
ASTM D 3330/D 3330M-04, "Standard Test Method for Peel Adhesion of Pressure-Sensitive Tape", (2004), pp. 1-6, ASTM Int'l.
ASTM D 3654/D 3654M-06, "Standard Test Methods for Shear Adhesion of Pressure-Sensitive Tapes", (2006), pp. 1-6, ASTM Int'l.
Rosenthal et al., "The Synthesis of β-Amino Mercaptans and β-Amino Thiosulfates via Ethylenimine Intermediates", Journal of Organic Chemistry, vol. 30, Issue 11, Nov. 1965, pp. 3689-3696.
McCormick et al., "Water-Soluble Polymers," Encyclopedia of Polymer Science and Technology, pp. 452-521, Jul. 2004.

(Continued)

Primary Examiner — Mark Kaucher
(74) Attorney, Agent, or Firm — Kent S. Kokko

(57) ABSTRACT

A pre-adhesive syrup copolymer composition comprising an acid functional acrylate solute copolymer, a monomer solvent mixture, and a polyaziridine crosslinking agent is disclosed.

20 Claims, No Drawings

(56) References Cited

U.S. PATENT DOCUMENTS

| | | | |
|---|---|---|---|
| 7,652,095 | B2 | 1/2010 | Filiatrault et al. |
| 7,652,103 | B2 | 1/2010 | Kavanagh et al. |
| 7,691,915 | B2 | 4/2010 | Kim et al. |
| 8,067,504 | B2 | 11/2011 | Erdogan et al. |
| 2003/0215630 | A1 | 11/2003 | Melancon et al. |
| 2007/0213463 | A1 | 9/2007 | Sherman et al. |
| 2007/0299211 | A1 | 12/2007 | Chen et al. |
| 2008/0087196 | A1 | 4/2008 | Anderson et al. |
| 2008/0200587 | A1 | 8/2008 | Filiatrault et al. |
| 2009/0208740 | A1* | 8/2009 | Kavanagh et al. ...... 428/355 AC |
| 2009/0246390 | A1 | 10/2009 | Krepski et al. |
| 2010/0081759 | A1 | 4/2010 | Kavanagh et al. |
| 2010/0137469 | A1 | 6/2010 | Zhu et al. |
| 2012/0052780 | A1 | 3/2012 | Krause et al. |

FOREIGN PATENT DOCUMENTS

| | | |
|---|---|---|
| EP | 0 530 729 | 3/1993 |
| EP | 1 179 577 | 2/2002 |
| JP | 02070780 | 9/1988 |
| JP | 01075577 | 3/1989 |
| JP | 02178379 | 7/1990 |
| JP | 04372682 | 6/1991 |
| JP | 03281586 | 12/1991 |
| JP | 04161477 | 6/1992 |
| JP | 07138542 | 11/1993 |
| JP | 07011211 | 1/1995 |
| JP | 07138544 | 5/1995 |
| WO | WO 95/10552 | 4/1995 |
| WO | WO 97/05100 | 2/1997 |
| WO | WO 02/38694 | 5/2002 |
| WO | WO 2004/029171 | 4/2004 |
| WO | WO 2005/092403 | 10/2005 |
| WO | WO 2008/100713 | 8/2008 |
| WO | WO 2008/100755 | 8/2008 |
| WO | WO 2009/102623 | 8/2009 |
| WO | WO 2009/120420 | 10/2009 |
| WO | WO 2009/152126 | 12/2009 |

OTHER PUBLICATIONS

Iwakura et al., "A Novel Preparation of Pseudoxzaolones," Tetraheron, vol. 23, pp. 3363-3373, Pergamon Press Ltd., (1967).

Hubner et al., Makromolekulare Chem., vol. 11, No. 124, pp. 109-124, (1970).

Taylor et al., "The Synthesis of Vinyl Peptide Monomers," Journal of Polymer Science, Polymer Letters, vol. 7, pp. 597-603, (1969).

Kulkari et al., "Effect of Asymmetric Centers on Free Radical Polymerization and the Properties of Polymers: Methacrylyl Alanine, Methacrylyl Glutamic Acid, Acrylyl Glutamic Acid, and Their Polymers," Journal of Polymer Science, vol. 54, pp. 491-503, (1961).

Czech, Zbigniew, "New generation of crosslinking agents based on multifunctional methylaziridines," International Journal of Adhesion & Adhesives, vol. 27, (2007), pp. 49-58.

* cited by examiner

CROSSLINKABLE ACRYLATE ADHESIVE POLYMER COMPOSITION

CROSS REFERENCE TO RELATED APPLICATIONS

This application is a divisional of U.S. application Ser. No. 12/849,887, filed Aug. 4, 2010, now pending, which claims priority from Chinese Application No. 201010004903.9, filed Jan. 20, 2010.

TECHNICAL FIELD OF THE INVENTION

This invention relates to pressure-sensitive adhesives and tape articles prepared therefrom. The tapes are characterized by exhibiting an overall balance of adhesive and cohesive characteristics and exceptional load bearing capabilities at elevated temperatures.

BACKGROUND OF THE INVENTION

Pressure-sensitive tapes are virtually ubiquitous in the home and workplace. In its simplest configuration, a pressure-sensitive tape comprises an adhesive and a backing, and the overall construction is tacky at the use temperature and adheres to a variety of substrates using only moderate pressure to form the bond. In this fashion, pressure-sensitive tapes constitute a complete, self-contained bonding system.

According to the Pressure-Sensitive Tape Council, pressure-sensitive adhesives (PSAs) are known to possess properties including the following: (1) aggressive and permanent tack, (2) adherence with no more than finger pressure, (3) sufficient ability to hold onto an adherend, and (4) sufficient cohesive strength to be removed cleanly from the adherend. Materials that have been found to function well as PSAs include polymers designed and formulated to exhibit the requisite viscoelastic properties resulting in a desired balance of tack, peel adhesion, and shear holding power. PSAs are characterized by being normally tacky at room temperature (e.g., 20° C.). PSAs do not embrace compositions merely because they are sticky or adhere to a surface.

These requirements are assessed generally by means of tests which are designed to individually measure tack, adhesion (peel strength), and cohesion (shear holding power), as noted in A.V. Pocius in Adhesion and Adhesives Technology: An Introduction, $2^{nd}$ Ed., Hanser Gardner Publication, Cincinnati, Ohio, 2002. These measurements taken together constitute the balance of properties often used to characterize a PSA.

With broadened use of pressure-sensitive tapes over the years, performance requirements have become more demanding. Shear holding capability, for example, which originally was intended for applications supporting modest loads at room temperature, has now increased substantially for many applications in terms of operating temperature and load. So-called high performance pressure-sensitive tapes are those capable of supporting loads at elevated temperatures for 10,000 minutes. Increased shear holding capability has generally been accomplished by crosslinking the PSA, although considerable care must be exercised so that high levels of tack and adhesion are retained in order to retain the aforementioned balance of properties.

There are two major crosslinking mechanisms for acrylic adhesives: free-radical copolymerization of multifunctional ethylenically unsaturated groups with the other monomers, and covalent or ionic crosslinking through the functional monomers, such as acrylic acid. Another method is the use of UV crosslinkers, such as copolymerizable benzophenones or post-added photocrosslinkers, such as multifunctional benzophenones and triazines. In the past, a variety of different materials have been used as crosslinking agents, e.g., polyfunctional acrylates, acetophenones, benzophenones, and triazines. The foregoing crosslinking agents, however, possess certain drawbacks which include one or more of the following: high volatility; incompatibility with certain polymer systems; generation of corrosive or toxic by-products; generation of undesirable color; requirement of a separate photoactive compound to initiate the crosslinking reaction; and high sensitivity to oxygen.

SUMMARY OF THE INVENTION

The present disclosure is directed to a pre-adhesive syrup copolymer composition comprising an acid functional acrylate solute copolymer, a monomer solvent mixture, and a polyaziridine crosslinking agent. The present disclosure further provides a method of preparing a pre-adhesive syrup copolymer composition comprising: a) providing a syrup copolymer composition comprising an acid functional acrylate solute copolymer, a monomer solvent mixture, and a polyaziridine crosslinking agent; b) allowing the components to react, and subsequently adding additional acid functional monomer, such as acrylic acid. The pre-adhesive syrup polymer composition may be polymerized and crosslinked to produce a pressure-sensitive adhesive.

The use of the novel composition and method affords a number of advantages as compared to conventional (meth) acrylate syrup polymer composition. These advantages include, but are not limited to, decreased sensitivity of the crosslinkable composition to oxygen; the avoidance of evolution of any toxic or corrosive by-products or discoloration of the final product; and the capability to be used as a post-curing crosslinking additive. In addition, the cured adhesives exhibit high peel strength, and high cohesive strength, and high temperature shear strength.

It as been found that restricting the amount of acid functional monomer in the solute polymer and solvent monomers, and the amount of polyaziridine crosslinking agent minimizes the amount of "dead polymer" produced. The dead polymer reduces the crosslink density, and provides poor shear properties—particularly at elevated temperatures.

The pressure-sensitive adhesives of this disclosure, i.e. the crosslinked syrup polymer compositions, provide the desired balance of tack, peel adhesion, and shear holding power, and further conform to the Dahlquist criteria; i.e. the modulus of the adhesive at the application temperature, typically room temperature, is less than $3 \times 10^6$ dynes/cm at a frequency of 1 Hz.

"Syrup polymer" refers to a solution of a solute polymer in one or more solvent monomers, the solution having a viscosity of from 500 to 10,000 c.P at 22° C.

In this application, (meth)acrylic is inclusive of both methacrylic and acrylic.

As used herein, "alkyl" includes straight-chained, branched, and cyclic alkyl groups and includes both unsubstituted and substituted alkyl groups. Unless otherwise indicated, the alkyl groups typically contain from 1 to 20 carbon atoms. Examples of "alkyl" as used herein include, but are not limited to, methyl, ethyl, n-propyl, n-butyl, n-pentyl, isobutyl, t-butyl, isopropyl, n-octyl, n-heptyl, ethylhexyl, cyclopentyl, cyclohexyl, cycloheptyl, adamantyl, and norbornyl, and the like. Unless otherwise noted, alkyl groups may be mono- or polyvalent.

As used herein, the term "heteroalkyl" includes both straight-chained, branched, and cyclic alkyl groups with one or more heteroatoms independently selected from S, O, and N with both unsubstituted and substituted alkyl groups. Unless otherwise indicated, the heteroalkyl groups typically contain from 1 to 20 carbon atoms. "Heteroalkyl" is a subset of "hydrocarbyl containing one or more S, N, O, P, or Si atoms" described below. Examples of "heteroalkyl" as used herein include, but are not limited to, methoxy, ethoxy, propoxy, 3,6-dioxaheptyl, 3-(trimethylsilyl)-propyl, 4-dimethylaminobutyl, and the like. Unless otherwise noted, heteroalkyl groups may be mono- or polyvalent.

As used herein, "aryl" is an aromatic group containing 6-18 ring atoms and can contain optional fused rings, which may be saturated, unsaturated, or aromatic. Examples of an aryl groups include phenyl, naphthyl, biphenyl, phenanthryl, and anthracyl. Heteroaryl is aryl containing 1-3 heteroatoms such as nitrogen, oxygen, or sulfur and can contain fused rings. Some examples of heteroaryl groups are pyridyl, furanyl, pyrrolyl, thienyl, thiazolyl, oxazolyl, imidazolyl, indolyl, benzofuranyl, and benzthiazolyl. Unless otherwise noted, aryl and heteroaryl groups may be mono- or polyvalent.

As used herein, "(hetero)hydrocarbyl" is inclusive of hydrocarbyl alkyl and aryl groups, and heterohydrocarbyl heteroalkyl and heteroaryl groups, the later comprising one or more catenary oxygen heteroatoms such as ether or amino groups. Heterohydrocarbyl may optionally contain one or more catenary (in-chain) functional groups including ester, amide, urea, urethane, and carbonate functional groups. Unless otherwise indicated, the non-polymeric (hetero)hydrocarbyl groups typically contain from 1 to 60 carbon atoms. Some examples of such heterohydrocarbyls as used herein include, but are not limited to, methoxy, ethoxy, propoxy, 4-diphenylaminobutyl, 2-(2'-phenoxyethoxy)ethyl, 3,6-dioxaheptyl, 3,6-dioxahexyl-6-phenyl, in addition to those described for "alkyl", "heteroalkyl", "aryl", and "heteroaryl" supra.

As used herein, "dead polymer" refers to a polymerized, generally non-reactive polymer. i.e. the dead polymer does not have unsaturated groups within or attached to the chain.

DETAILED DESCRIPTION

The syrup polymer composition comprises a first component solute copolymer comprising:
1) 100 parts by weight of an (meth)acrylic acid ester monomer units;
2) 0.01 to less than 5 parts by weight of an acid functional monomer units;
3) 0 to 25 parts by weight of a second, non-acid functional, polar monomer units; and
4) 0 to 5 parts vinyl monomer units.

The (meth)acrylate ester monomer is present in an amount of 100 parts by weight to calculate the amounts of the remaining monomers. The (meth)acrylate ester monomer useful in preparing the acid functional (meth)acrylate adhesive copolymer is a monomeric (meth)acrylic ester of a non-tertiary alcohol, which alcohol contains from 1 to 14 carbon atoms and preferably an average of from 4 to 12 carbon atoms.

Examples of monomers suitable for use as the (meth)acrylate ester monomer include the esters of either acrylic acid or methacrylic acid with non-tertiary alcohols such as ethanol, 1-propanol, 2-propanol, 1-butanol, 2-butanol, 1-pentanol, 2-pentanol, 3-pentanol, 2-methyl-1-butanol, 3-methyl-1-butanol, 1-hexanol, 2-hexanol, 2-methyl-1-pentanol, 3-methyl-1-pentanol, 2-ethyl-1-butanol, 3,5,5-trimethyl-1-hexanol, 3-heptanol, 1-octanol, 2-octanol, isooctylalcohol, 2-ethyl-1-hexanol, 1-decanol, 2-propylheptanol, 1-dodecanol, 1-tridecanol, 1-tetradecanol, citronellol, dihydrocitronellol, and the like. In some embodiments, the preferred (meth)acrylate ester monomer is the ester of (meth)acrylic acid with butyl alcohol or isooctyl alcohol, or a combination thereof, although combinations of two or more different (meth)acrylate ester monomer are suitable. In some embodiments, the preferred (meth)acrylate ester monomer is the ester of (meth)acrylic acid with an alcohol derived from a renewable sources, such as 2-octanol, citronellol, dihydrocitronellol.

In some embodiments it is desirable for the (meth)acrylic acid ester monomer to include a high $T_g$ monomer, have a $T_g$ of at least 25° C., and preferably at least 50° C. Suitable high $T_g$ monomers include Examples of suitable monomers useful in the present invention include, but are not limited to, t-butyl acrylate, methyl methacrylate, ethyl methacrylate, isopropyl methacrylate, n-butyl methacrylate, isobutyl methacrylate, s-butyl methacrylate, t-butyl methacrylate, stearyl methacrylate, phenyl methacrylate, cyclohexyl methacrylate, isobornyl acrylate, isobornyl methacrylate, benzyl methacrylate, 3,3,5 trimethylcyclohexyl acrylate, cyclohexyl acrylate, N-octyl acrylamide, and propyl methacrylate or combinations.

When high $T_g$ monomers are included, the copolymer may include up to 30 parts by weight, preferably up to 20 parts by weight of the 100 parts by weight of (meth)acrylate ester monomer component. In such embodiments, the (meth)acrylate ester monomer component of the copolymer may comprise:
i. 1 to 30 parts by weight of an (meth)acrylic acid ester having a $T_g$ of greater than 25° C.;
ii. 99 to 70 parts by weight of an (meth)acrylic acid ester having a $T_g$ of less than 25° C.

The solute copolymer further comprises an acid functional monomer, where the acid functional group may be an acid per se, such as a carboxylic acid, or a portion may be salt thereof, such as an alkali metal carboxylate. Useful acid functional monomers include, but are not limited to, those selected from ethylenically unsaturated carboxylic acids, ethylenically unsaturated sulfonic acids, ethylenically unsaturated phosphonic acids, and mixtures thereof. Examples of such compounds include those selected from acrylic acid, methacrylic acid, itaconic acid, fumaric acid, crotonic acid, citraconic acid, maleic acid, oleic acid, β-carboxyethyl(meth)acrylate, 2-sulfoethyl methacrylate, styrene sulfonic acid, 2-acrylamido-2-methylpropanesulfonic acid, vinylphosphonic acid, and mixtures thereof.

Due to their availability, acid functional monomers of the acid functional copolymer are generally selected from ethylenically unsaturated carboxylic acids, i.e. (meth)acrylic acids. When even stronger acids are desired, acidic monomers include the ethylenically unsaturated sulfonic acids and ethylenically unsaturated phosphonic acids. The acid functional monomer is generally used in amounts of 0.01 to less than 5 parts by weight, preferably 0.1 to less than 2.5 parts by weight, most preferably 0.1 to less than 1 parts by weight, based on 100 parts of an (meth)acrylic acid ester monomer.

The polar monomers useful in preparing the copolymer are both somewhat oil soluble and water soluble, resulting in a distribution of the polar monomer between the aqueous and oil phases in an emulsion polymerization. As used herein the term "polar monomers" are exclusive of acid functional monomers.

Representative examples of suitable polar monomers include but are not limited to 2-hydroxyethyl(meth)acrylate; N-vinylpyrrolidone; N-vinylcaprolactam; acrylamide;

mono- or di-N-alkyl substituted acrylamide; t-butyl acrylamide; dimethylaminoethyl acrylamide; N-octyl acrylamide; poly(alkoxyalkyl)(meth)acrylates including 2-(2-ethoxyethoxy)ethyl(meth)acrylate, 2-ethoxyethyl(meth)acrylate, 2-methoxyethoxyethyl(meth)acrylate, 2-methoxyethyl methacrylate, polyethylene glycol mono(meth)acrylates; alkyl vinyl ethers, including vinyl methyl ether; and mixtures thereof. Preferred polar monomers include those selected from the group consisting of 2-hydroxyethyl(meth)acrylate and N-vinylpyrrolidinone. The polar monomer may be present in amounts of 0 to 25 parts by weight, preferably 0.1 to 10 parts by weight, most preferably 0.5 to 5 parts by weight, based on 100 parts by weight (meth)acrylate ester monomer.

When used, vinyl monomers useful in the (meth)acrylate polymer include vinyl esters (e.g., vinyl acetate and vinyl propionate), styrene, substituted styrene (e.g., α-methyl styrene), vinyl halide, and mixtures thereof. As used herein vinyl monomers are exclusive of acid functional monomers, acrylate ester monomers and polar monomers. Such vinyl monomers are generally used at 0 to 5 parts by weight, preferably 1 to 5 parts by weight, based on 100 parts by weight (meth) acrylate ester monomer.

In order to increase cohesive strength of the coated adhesive composition, a multifunctional (meth)acrylate may be incorporated into the blend of polymerizable monomers. Multifunctional acrylates are particularly useful for emulsion or syrup polymerization. Examples of useful multifunctional (meth)acrylate include, but are not limited to, di(meth)acrylates, tri(meth)acrylates, and tetra(meth)acrylates, such as 1,6-hexanediol di(meth)acrylate, poly(ethylene glycol)di(meth)acrylates, polybutadiene di(meth)acrylate, polyurethane di(meth)acrylates, and propoxylated glycerin tri(meth)acrylate, and mixtures thereof. The amount and identity of multifunctional (meth)acrylate is tailored depending upon application of the adhesive composition. Typically, the multifunctional (meth)acrylate is present in amounts less than 5 parts based on total dry weight of adhesive composition. More specifically, the crosslinker may be present in amounts from 0.01 to 5 parts, preferably 0.05 to 1 parts, based on 100 parts total monomers (polymerized or unpolymerized) of the adhesive composition. In some embodiments the crosslinking compositions contains no multifunctional (meth)acrylates.

The pre-adhesive composition further comprises an polyaziridine crosslinking agent, in addition to the (meth)acrylate copolymer. The aziridine crosslinking agent is generally added in amounts of 0.005 to 5.0 parts by weight of an aziridine crosslinking agent, relative to 100 parts of the copolymer. As used herein, the terms "polyaziridine" or "polyfunctional aziridine" refers to an organic compound in which at least two aziridine rings.

The aziridine crosslinking agent is of the general formula:

wherein
$R^1$ is a (hetero)hydrocarbyl group,
$R^2$ is an H or $C_1$-$C_4$ alkyl group,
x is 0, 1 or 2, and
y is 2 to 4.

Useful polyaziridine crosslinking agents are disclosed in U.S. Pat. No. 5,401,505 (Duell et al.), incorporated herein by reference. In some embodiments the $R^1$ group of formula I may be selected from:

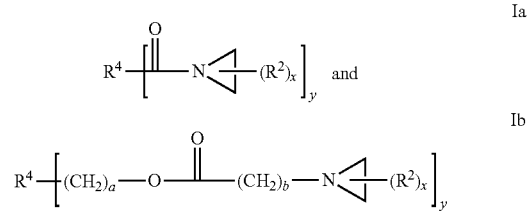

wherein
$R^4$ is a hydrocarbyl group, preferably an alkyl or aryl group or combination thereof having a valence of "y",
y is at least 2, preferably 2-4,
x is 0, 1 or 2; and
each of a and b are independently 0, 1 or 2.

Examples of other useful tri-functional aziridines include: trimethylolpropane tris-(2-methyl-1-aziridinepropionate), trimethylolpropane tris-(aziridinyl propionate), tetramethylolmethane tris(aziridinylpropionate), and pentaerythritol tris-3-(1-aziridinyl)propionate).

Other polyfunctional aziridines include difunctional aziridines such as: N,N'-toluene-2,4-bis(1-aziridinecarboxamide), N,N-hexamethylene-1,6-bis(1-aziridinecarboxamide), N,N'-hexamethylene-bis-1,6-bis-(2-methyl-1-aziridinecarboxamide), 1,6-hexanediol bis-(aziridinyl propionate), and 1,6-hexanediol bis-(2-methyl aziridinyl propionate).

Examples of useful, commercially available polyaziridines include CX-100™ (from Zeneca Resins), and XAMA-7™ (from EIT, Inc.).

In some embodiments, the polyaziridine crosslinking agent is a bisamide crosslinking agent of the general formula:

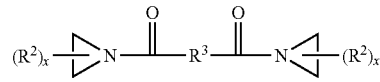

wherein
$R^3$ is a (hetero)hydrocarbyl group, preferably an aryl group, a triazine group or an alkylene group;
$R^2$ is an H or $C_1$-$C_4$ alkyl group,
x is 0, 1 or 2

Bisamide crosslinking agents include to bisaziridine derivatives of diacids (or functional equivalent thereof such as esters) including aromatic, aliphatic and cycloaliphatic diacids such as phthalic acid, hexahydrophthalic acid, succinic acid, maleic acid, itaconic acid, glutaric acid, adipic acid, and oxydipropionic acid. Useful bisamide-type crosslinking agents include those aromatic bisamide crosslinking agents and acrylic adhesive prepared therefrom described in U.S. Pat. No. 6,893,718 (Melancon et al.).

A method of preparing acid functional (meth)acrylate solute copolymers comprises partially polymerizing monomers to produce a syrup solute copolymer comprising the acid functional (meth)acrylate copolymer and unpolymerized monomers. The syrup copolymer composition is polymerized to a useful coating viscosity, which may be coated onto a substrate (such as a tape backing) and further polymerized. Partial polymerization provides a coatable solution of the acid functional (meth)acrylate solute copolymer in one or more solvent monomers. Generally, the polyaziridine crosslinking agent is added to the partially polymerized syrup copolymer composition, then coated on a suitable substrate and further polymerized.

For syrup application processing, a preferred monomer mixture (second solvent monomer component) comprises 100 parts of one or more (meth)acrylate ester monomers, 0.01 to less than 5 parts, preferably 0.1 to less than 1.5 parts by weight of acid functional monomers, 0 to 20 pbw of one or more second, non-acid, polar monomers, and 0 to about 5 pbw of other vinyl monomers, based on 100 parts total monomer.

It will be understood that the solute copolymer is prepared from the initial monomer mixture, and the solvent monomers comprise the remaining, unpolymerized monomer component. However, it is believed that the acid functional monomer is more reactive in polymerization than other component monomers, so that the solute copolymer is enriched in acid functional monomer, and the solvent monomer component is depleted in acid functional monomer. For example, if the original monomer composition comprised 1 part by weight of acid functional monomer, such as acrylic acid, the solute copolymer would have greater than 1 part by weight, and the solvent monomer component would have less that 1 part by weight.

The polymerizations may be conducted in the presence of, or preferably in the absence of, suitable solvents such as ethyl acetate, toluene and tetrahydrofuran which are unreactive with the functional groups of the components of the syrup polymer.

Polymerization can be accomplished by exposing the syrup polymer composition to energy in the presence of an initiator, such as a photoinitiator. Energy activated initiators may be unnecessary where, for example, ionizing radiation is used to initiate polymerization. These photoinitiators can be employed in concentrations ranging from about 0.0001 to about 3.0 pbw, preferably from about 0.001 to about 1.0 pbw, and more preferably from about 0.005 to about 0.5 pbw, per 100 pbw of the solvent monomer(s).

A preferred method of preparation of the syrup polymer is photoinitiated free radical polymerization. Advantages of the photopolymerization method are that 1) heating the monomer solution is unnecessary and 2) photoinitiation is stopped completely when the activating light source is turned off. Polymerization to achieve a coatable viscosity may be conducted such that the conversion of monomers to polymer is up to about 30%. Polymerization can be terminated when the desired conversion and viscosity have been achieved by removing the light source and by bubbling air (oxygen) into the solution to quench propagating free radicals. The solute polymer(s) may be prepared conveniently in a non-monomeric solvent and advanced to high conversion (degree of polymerization). When solvent (monomeric or non-monomeric) is used, the solvent may be removed (for example by vacuum distillation) either before or after formation of the syrup polymer. While an acceptable method, this procedure involving a highly converted functional polymer is not preferred because an additional solvent removal step is required, another material may be required (the non-monomeric solvent), and dissolution of the high molecular weight, highly converted solute polymer in the monomer mixture may require a significant period of time.

Useful photoinitiators include benzoin ethers such as benzoin methyl ether and benzoin isopropyl ether; substituted acetophenones such as 2,2-dimethoxyacetophenone, available as Irgacure™ 651 photoinitiator (Ciba Specialty Chemicals), or as Esacure™ KB-1 photoinitiator (Sartomer Co.; West Chester, Pa.), and dimethoxyhydroxyacetophenone; substituted α-ketols such as 2-methyl-2-hydroxy propiophenone; aromatic sulfonyl chlorides such as 2-naphthalenesulfonyl chloride; and photoactive oximes such as 1-phenyl-1,2-propanedione-2-(O-ethoxy-carbonyl)oxime. Particularly preferred among these are the substituted acetophenones.

Preferred photoinitiators are photoactive compounds that undergo a Norrish I cleavage to generate free radicals that can initiate by addition to the acrylic double bonds. The photoinitiator can be added to the mixture to be coated after the copolymer has been formed, i.e., photoinitiator can be added to the syrup polymer mixture. Such polymerizable photoinitiators are described, for example, in U.S. Pat. Nos. 5,902,836 and 5,506,279 (Babu et al.).

The syrup polymer composition and the photoinitiator may be irradiated with activating UV radiation to polymerize the monomer component(s). UV light sources can be of two types: 1) relatively low light intensity sources such as Blacklights which provide generally 10 mW/cm$^2$ or less (as measured in accordance with procedures approved by the United States National Institute of Standards and Technology as, for example, with a UVIMAP™ UM 365 L-S radiometer manufactured by Electronic Instrumentation & Technology, Inc., in Sterling, Va.) over a wavelength range of 280 to 400 nanometers and 2) relatively high light intensity sources such as medium pressure mercury lamps which provide intensities generally greater than 10 mW/cm$^2$, preferably between 15 and 450 mW/cm$^2$. Where actinic radiation is used to fully or partially polymerize the syrup polymer composition, high intensities and short exposure times are preferred. For example, an intensity of 600 mW/cm$^2$ and an exposure time of about 1 second may be used successfully. Intensities can range from about 0.1 to about 150 mW/cm$^2$, preferably from about 0.5 to about 100 mW/cm$^2$, and more preferably from about 0.5 to about 50 mW/cm$^2$. Such photoinitiators preferably are present in an amount of from 0.1 to 1.0 pbw per 100 pbw of the syrup polymer composition.

Accordingly, relatively thick coatings (e.g., at least about 1 mil or 25.4 micrometers) can be achieved when the extinction coefficient of the photoinitiator is low.

The degree of conversion can be monitored during the irradiation by measuring the index of refraction of the polymerizing medium as previously described. Useful coating viscosities are achieved with conversions (i.e. the percentage of available monomer polymerized) in the range of up to 30%, preferably 2-20%, more preferably from 5-15%, and most preferably from 7-12%. Generally, the conversion is measured as a function of the viscosity, and the monomers are converted such that the syrup copolymer has a viscosity of 3000 to 5000 cP.

When preparing acid functional (meth)acrylate copolymers, it is expedient for the photoinitiated polymerization reactions to proceed to virtual completion, i.e., depletion of the monomeric components, at temperatures less than about 70° C. (preferably at 50° C. or less) with reaction times less than 24 hours, preferably less than 12 hours, and more preferably less than 6 hours. These temperature ranges and reaction rates obviate the need for free radical polymerization inhibitors, which are often added to acrylic systems to stabilize against undesired, premature polymerization and gelation. Furthermore, the addition of inhibitors adds extraneous material that will remain with the system and inhibit the desired polymerization of the syrup polymer and formation of the crosslinked pressure sensitive adhesives.

In a first embodiment of the method of preparing a pre-adhesive acrylate copolymer composition, the syrup copolymer composition is combined with the polyaziridine crosslinking agent and allowed to react.

Once the components have reacted, subsequent additional amounts of acid functional monomers may be added to produce pre-adhesive acrylate copolymers having higher acid content. Relatively smaller amounts of dead polymer are produced in the syrup polymer composition on reaction with the polyaziridine crosslinking agent.

In a second embodiment of the method, the syrup copolymers is combined with the polyaziridine crosslinking agent, additional acid functional monomer, and allowed to react.

The method comprises providing a syrup copolymer, and combining therewith a polyaziridine crosslinking agent and additional acid functional monomer. The method may comprise combining the syrup copolymer with the polyaziridine crosslinking agent, and subsequently additional acid functional monomer, or may comprise combining the syrup copolymer with a mixture of the polyaziridine crosslinking agent and additional acid functional monomer. Generally, the total amount of acid functional monomer, including that of the solute copolymer, the solvent monomer and the additional charge is 15 parts by weight or less, relative to 100 parts of (meth)acrylate ester.

In the method described herein, the syrup polymer composition generally comprises
1) a first component solute copolymer comprising:
   i. 100 parts by weight of an (meth)acrylic acid ester monomer units;
   ii. 0.01 to less than 10 parts by weight of an acid functional monomer units;
   iii. 0 to 10 parts by weight of a second, non-acid functional, polar monomer units;
   iv. 0 to 5 parts vinyl monomer units, and
2) a second solvent monomer component comprising at least one free-radically polymerizable solvent monomer comprising:
   v. 100 parts by weight of an (meth)acrylic acid ester monomers;
   vi. 0.01 to less than 10 parts by weight of an acid functional monomer;
   vii. 0 to 10 parts by weight of a second, non-acid functional, polar monomers;
   viii. 0 to 5 parts vinyl monomer, and
3) 0.005 to 5.0 parts by weight of an aziridine crosslinking agent, relative to 100 parts of the copolymer;

The components are allowed to react whereby the crosslinking agent is depleted by reaction with the acid functional monomer units of the copolymer and the acid functional monomers of the solvent monomers. Additional acid functional monomers may then added to provide the pre-adhesive syrup polymer composition that may be subsequently crosslinked to provide a pressure-sensitive adhesive. Such additional acid functional solvent monomer may be added in amounts such that the total is up to 15 parts by weight, preferably 1-10 parts by weight, relative to 100 parts of the (meth)acrylic ester. For example, if the additional monomer mixture comprises 1 part by weight of acid functional monomer, such as acrylic acid, up to 14 parts by weight of addition acid functional monomer may be added to the syrup copolymer. It is preferred to add the additional acid functional monomer within an hour of forming the syrup copolymer.

While not wishing to be bound by theory, it is believed the following reaction Scheme illustrates an embodiment of the method, and benefits thereof. For simplicity, the solute copolymer "co-P" is illustrated with just the acid-functional monomer units. In the first step the syrup copolymer, comprising the solute copolymer "co-P" and the solvent monomers is combined the polyaziridine crosslinking agent—corresponding to Formula I (with y=2, and $R^2$ not shown). This may yield one of two reaction products. The product of formula III is the reaction product of the solute polymer with the polyaziridine crosslinking agent. The product of Formula IV is the reaction product of an acid functional monomer, illustrated as acrylic acid (AA) with the polyaziridine crosslinking agent. In this embodiment, the solute copolymer is enriched, and the solvent monomers depleted, in acid functional monomers.

Intermediate product III may react with additional solute copolymer "co-P" to form product V. As can been seen, product V is a dead polymer—having no unsaturated groups for further polymerization or crosslinking. Intermediate product III may also react with solvent monomer acrylic acid (AA) to form a product of formula VI having the requisite unsaturation for further polymerization or crosslinking The compound of Formula IV may react with copolymer "co-P" to also produce a product of formula VI having the requisite unsaturation. In addition, the compound of Formula IV may react with solvent monomer acrylic acid (AA) to form a product of formula VII, also bearing the requisite unsaturation for further polymerization or crosslinking In the second embodiment of the method the syrup copolymer is combined with a mixture of the polyaziridine crosslinking agent and additional acid functional monomer.

The method of the invention minimizes the amount of dead polymer V. It is further believed that dead polymer, lacking unsaturated groups for incorporation into the polymer during polymerization, is free to migrate via diffusion and/or absorption processes. It is believed that the dead polymer V preferentially adsorbs at the high energy surface creating a poorly crosslinked, weak boundary layer, leading to low shear properties in the final crosslinked adhesive.

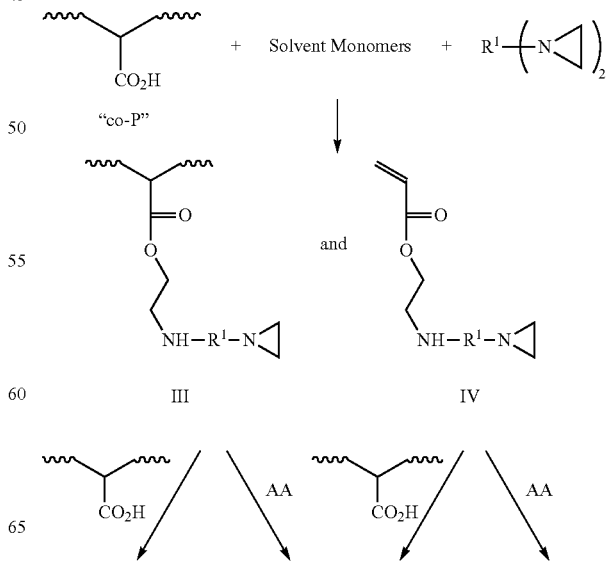

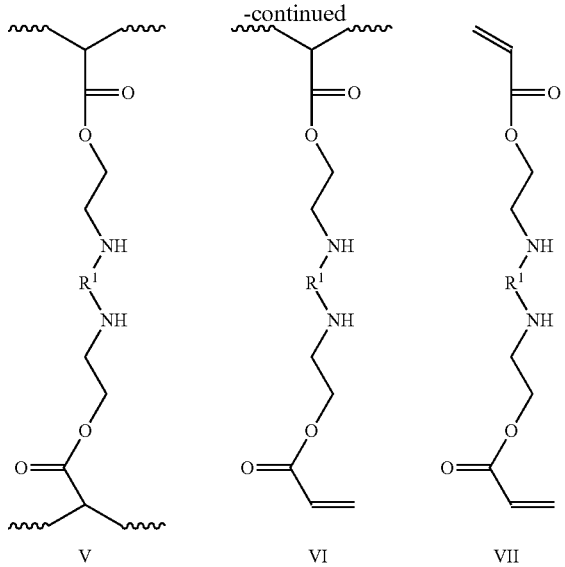

V   VI   VII

It is preferable to coat the adhesive composition soon after preparation. The adhesive polymer composition, (containing the copolymer, monomers and crosslinking agent system), either as a syrup or solution are easily coated upon suitable substrates, such as flexible backing materials, by conventional coating techniques, then further polymerized, and cured or dried, to produce adhesive coated sheet materials. The flexible backing material may be any material conventionally utilized as a tape backing, optical film or any other flexible material.

The pressure sensitive adhesives may also contain one or more conventional additives. Preferred additives include tackifiers, plasticizers, dyes, antioxidants, and UV stabilizers. Such additives can be used if they do not affect the superior properties of the pressure sensitive adhesives.

If tackifiers are used, then up to about 50% by weight, preferably less than 30% by weight, and more preferably less than 5% by weight based on the dry weight of the total adhesive polymer would be suitable. In some embodiments no tackifiers may be used. Suitable tackifiers for use with (meth)acrylate polymer dispersions include rosin acids, rosin esters, terpene phenolic resins, hydrocarbon resins, and cumarone indene resins. The type and amount of tackifier can affect properties such as contactability, bonding range, bond strength, heat resistance and specific adhesion.

Adhesive articles may be prepared by coating the adhesive or pre-adhesive composition on a suitable support, such as a flexible backing Examples of materials that can be included in the flexible backing include polyolefins such as polyethylene, polypropylene (including isotactic polypropylene), polystyrene, polyester, polyvinyl alcohol, poly(ethylene terephthalate), poly(butylene terephthalate), poly(caprolactam), poly(vinylidene fluoride), polylactides, cellulose acetate, and ethyl cellulose and the like. Commercially available backing materials useful in the invention include kraft paper (available from Monadnock Paper, Inc.); cellophane (available from Flexel Corp.); spun-bond poly(ethylene) and poly(propylene), such as Tyvek™ and Typar™ (available from DuPont, Inc.); and porous films obtained from poly(ethylene) and poly(propylene), such as Teslin™ (available from PPG Industries, Inc.), and Cellguard™ (available from Hoechst-Celanese).

Backings may also be prepared of fabric such as woven fabric formed of threads of synthetic or natural materials such as cotton, nylon, rayon, glass, ceramic materials, and the like or nonwoven fabric such as air laid webs of natural or synthetic fibers or blends of these. The backing may also be formed of metal, metalized polymer films, or ceramic sheet materials may take the form of any article conventionally known to be utilized with pressure sensitive adhesive compositions such as labels, tapes, signs, covers, marking indicia, and the like.

The above-described compositions are coated on a substrate using conventional coating techniques modified as appropriate to the particular substrate. For example, these compositions can be applied to a variety of solid substrates by methods such as roller coating, flow coating, dip coating, spin coating, spray coating knife coating, and die coating. These various methods of coating allow the compositions to be placed on the substrate at variable thicknesses thus allowing a wider range of use of the compositions. Coating thicknesses may vary as previously described.

The syrup polymers may be of any desirable concentration for subsequent coating, but is typically between 2 to 20 wt. % polymer solids in monomer, preferably 5 to 15 wt. %. The desired concentration may be achieved by further dilution of the coating composition, or by partial drying.

The flexible support may also comprise a release-coated substrate. Such substrates are typically employed when an adhesive transfer tape is provided. Examples of release-coated substrates are well known in the art and include, by way of example, silicone-coated kraft paper and the like. Tapes of the invention may also incorporate a low adhesion backing (LAB), which are known in the art.

EXAMPLES

Test Methods

Peel Adhesion Test [ASTM D 3330/D 3330M-04]

Two 0.5 inch by at least 4 inch (~1.3×10 cm) strips of adhesive coated onto Mitsubishi Hostphan™ primed polyester film were adhered to a glass plate by rolling a 2 kg roller onto the tape. At least 3.5 lineal inches (~8.9 cm) of the adhesive coated film sample was in contact with the glass plate and a short portion of the sample (the "free end") was kept from contacting the glass plate. The free end of the sample was pulled back to form a nearly 180° angle with the portion of the sample that was adhered to the glass plate. The free end of the sample was attached to the clamp of the adhesion tester scale. The peel adhesion test was initiated as soon as the sample was adhered to the glass plate, that is, the "dwell time" was kept as close to zero as possible. The force required to peel the tape was measured in ounces per 0.5 inches width with a platen speed of 90 inches per minute. The measurements for the two tape samples were averaged. Peel adhesion data was then normalized to Newtons/decimeter (N/dm) for the tables below.

Shear Strength Test [ASTM D-3654/D 3654M 06, PSTC-7]

For shear testing, a 0.5 inch by at least 4 inch (~1.3×10 cm) strip of adhesive coated onto Mitsubishi Hostphan™ primed polyester film was adhered by its adhesive to a stainless steel substrate and cut down to leave a 0.5 inch by 1.0 inch square (~1.3×2.6 cm) of adhesive coated sample adhered to the substrate with several inches of the free end of the sample looped back upon itself to form a loop for attaching a weighted load. A 2 kg roller was rolled over the adhered portion. The tape sample was hung in a 70° C. oven (for 70° C. shear testing) or in a constant temperature and humidity (CT, 25° C., 50% relative humidity) room. A 500 g load was attached to the tape sample for testing. Each sample was suspended until failure and/or test terminated. The time, in minutes, for the sample to separate from the substrate was recorded as the shear strength. The time to failure, as well as the mode of failure, were recorded. Samples were run in duplicate and averaged for the tables below.

Materials

| Raw Materials | Sources |
|---|---|
| Isooctyl acrylate (IOA) | 3M St. Paul MN |
| Acrylic Acid (AA) | Alfa Aesar, Wardhill, MA |
| Isobornyl acrylate (IBOA) | Sartomer Company, Exton, Pa. |
| 2,2 dimethoxy-2-phenyl-1-phenylethanone | Irgacure ™ 651 photoinitiator (Ciba Specialty Chemicals), and Esacure ™ KB-1 photoinitiator (Sartomer Co.; West Chester, PA), |
| 1,1'-isophthaloyl-bis-1-methylaziridine (Bisamide). 5.0 wt % in toluene. | 3M. St Paul, MN |
| Trimethylolpropanetris(3-(2-methylaziridino)propionate (CX-100) | DSM NeoResins. Wilmington, MA |

Examples 1-10

Effect of Acid Content on Pot Life of Bisamide

Syrup polymer compositions were prepared using IOA and AA using the procedures of U.S. Re 24906 (Ulrich) using 100 parts of IOA and the indicated amounts of AA of Table 1.

Bisamide/IOA solution (20 wt %) was added to these syrups at 0.22 parts level based on 100 parts of IOA. The mixtures were well mixed on a roller. Viscosity of these mixtures was monitored with a Brookfield Engineering Viscometer (Model: LVDVII+, Brookfield Eng. Labs. Inc. Stoughton, Mass. 02072) at room temperature. The spindle 4 was used and the spin speed was 30 RPM.

Results are summarized in the Table 1. It is believed that when AA is at 0.08 parts and Bisamide is at 0.22 parts, only half of aziridine group is reacted. When AA is at 0.15 parts and Bisamide is at 0.22 parts, all of aziridine groups and all acid groups are reacted. As can be seen, when acid AA content in the syrup is lower than 1.66 parts based on 90 parts of IOA, 0.22 parts of Bisamide has a pot life of greater than 144 hours.

TABLE 1

| Ex. | IOA (parts) | AA (parts) | Syrup Viscosity (c.P) | Viscosity (c.P) after mixing time (hours) | | | | |
|---|---|---|---|---|---|---|---|---|
| | | | | 0.25 | 1 | 8 | 24 | 144 |
| 01 | 100 | 0.08 | 3880 | | | 3780 | 3800 | 3800 |
| 02 | " | 0.15 | 5240 | | | 5080 | 5100 | 5100 |
| 03 | " | 0.56 | 4440 | | | 4260 | 4260 | 4260 |
| 04 | " | 1.11 | 4480 | | | 4320 | 4400 | 4660 |
| 05 | " | 1.66 | 4860 | | | 4640 | 4800 | 5500 |
| 06 | " | 2.22 | 4040 | | | 3880 | 4020 | 5160 (partially gelled) |
| 07 | " | 2.77 | 5940 | | | 5840 | 6300 | Gelled |
| 08 | " | 5.55 | 6360 | | | 7760 | Gelled | Gelled |
| 09 | " | 8.33 | 5640 | 5520 | 5980 | — | Gelled | Gelled |
| 10 | " | 11.1 | 4880 | 4680 | 5620 | — | Gelled | Gelled |

Examples 11-18

Effect of Acid Content on Pot Life of Bisamide when Post-Add AA to the Syrup

In the following Examples, low AA content syrup polymers were prepared using the procedures of U.S. Re 24906 (Ulrich) with 100 parts of IOA and the indicated amounts of AA of Table 2. These solute polymers were combined with additional AA monomer so the total AA is 11.1 parts per 100 parts of IOA as shown in Table 2. Bisamide/IOA solution (20 wt %) was added to these syrups at 0.22 parts level based on 100 parts of IOA. Viscosity of these mixtures was monitored as previously described. Results are summarized in Table 2.

As can be seen, when the initial AA content in the syrup was lower than 2.78 parts (relative to 100 parts of IOA) the Bisamide has adequate pot life. When the AA is higher than 5.56 parts, the syrup gelled.

TABLE 2

| Ex. | IOA (parts) | AA (parts) | AA post added (parts) | Viscosity (c.P) after indicated time (hours) | | |
|---|---|---|---|---|---|---|
| | | | | 8 | 24 | 144 |
| 11 | 100 | 0.08 | 11.03 | 2820 | 2840 | 2840 |
| 12 | " | 0.15 | 10.96 | 3780 | 3840 | 3840 |
| 13 | " | 0.55 | 10.56 | 3240 | 3240 | 3240 |
| 14 | " | 1.11 | 10.00 | 3360 | 3400 | 3440 |
| 15 | " | 1.67 | 9.44 | 3700 | 3780 | 3880 |
| 16 | " | 2.22 | 8.89 | 3220 | 3440 | 3500 |
| 17 | " | 2.78 | 8.33 | 4900 | 4920 | 5040 |
| 18 | " | 5.55 | 5.56 | 6740 | 6920 | Gelled |

Examples C1, 19-20

Evidence of Pendant C═C in Syrup Polymer (NMR Study)

A syrup solution of IOA/AA (100/1.1) was prepared using procedures of U.S. Re 24906 (Ulrich). The syrup was divided to 3 portions. The first portion was used as a control (C1). To the second portion was added Bisamide/IOA solution so that Bisamide was 0.22 parts based on 100 parts total of IOA (Ex. 19). To the third portion was first added 10 parts of AA monomer then 0.22 parts of Bisamide (Ex. 20).

All the solutions were mixed on a roller for 24 hours. The three samples were quenched in methanol to precipitate the copolymers. The polymer precipitations (labeled as C1, 19, 20) were thoroughly washed with methanol then dried under vacuum at room temperature overnight. $^1$H NMR spectra of these three copolymers revealed that Example C1 had little pendent unsaturation—characteristic of the dead polymer V of Scheme 1. Examples 19 and 20 had significant pendent unsaturation—characteristic of the polymer VI of Scheme 1. It is believed that any compound corresponding to Formula VII of Scheme 1 is washed out during the precipitation.

Examples 21-27

Evidence of Pendant C═C in Syrup Polymer (Gelation Study)

The following syrups were made with various AA content as shown in Table 3, using procedures of U.S. Re 24906 (Ulrich). To those syrups were added additional AA so that total AA was 11.1 parts (relative to 100 parts of IOA). Bisamide (0.22 parts relative to 100 parts of IOA) was then added. The mixtures were rolled on a roller over 64 hours. They were quenched in methanol to precipitate the copolymers. Polymer precipitates were collected then dried under vacuum at room temperature, then dissolved in toluene at 10 wt %.

IRGACURE 651 photoinitiator (0.2 parts relative to 100 parts of polymer solid) was then added. The solutions were degassed, then exposed to low intensity UV for 2 minutes. The results are shown in Table 3.

TABLE 3

| Ex. | IOA (parts) | AA (parts) | Post add AA (parts) | Bisamide (parts) | Results |
|---|---|---|---|---|---|
| 21 | 100 | 0.08 | 11.03 | 0.22 | Not gelled |
| 22 | " | 0.15 | 10.96 | " | Not gelled |
| 23 | " | 0.55 | 10.56 | " | Not gelled |
| 24 | " | 1.11 | 10.00 | " | Not gelled |
| 25 | " | 1.67 | 9.44 | " | Gelled |
| 26 | " | 2.22 | 8.89 | " | Gelled |
| 27 | " | 2.78 | 8.33 | " | Gelled |

As can be seen, Examples 25, 26, 27 gelled under these conditions. This indicates that when AA is 1.67 parts or greater, and 0.22 parts Bisamide (relative to 100 parts of IOA) in the syrup, post-added AA (total AA 11.1 parts), significant amount of carboxylic acid groups in the polymer can react with Bisaziridine to form a pendant unsaturated reactive copolymer (polymer VI in Scheme I).

Examples 28-30

PSA Formulations with High Acid Polymer. (Mixing Sequence: Syrup+Bisamide+additional AA monomer)

Three syrups were made using procedures of U.S. Re 24906 (Ulrich), with the IOA/AA ratios shown in Table 4. To these syrups were added Bisamide/IOA (20 wt %) solution so that Bisamide content was 0.22 parts (relative to 100 parts of IOA). The mixtures were mixed on a roller for 24 hours. Additional AA monomer was added to these syrup copolymers so that the total AA amount was 11.1 parts (relative to 100 parts of IOA). The mixtures were further mixed for 1 hour then knife coated between a PET substrate (Mitsubishi 3SAB) and silicone release liner (Siliconature) at 2 mil coating thickness. The samples were exposed to low intensity UV light for 400 mJ/cm² to cure.

Shear and 180° peel were tested after the tapes were left at a constant temperature room ("CT room" 25° C., 50% relative humidity) for 24 hours. Results are summarized in Table 4.

TABLE 4

| | | | | Additional | Peel | Shear | |
| | IOA | AA | Bisamide | AA | on glass | on SS (min) | |
|---|---|---|---|---|---|---|---|
| Ex. | (parts) | (parts) | (parts) | (parts) | (N/dm) | RT | 70° C. |
| 28 | 100 | 1.11 | 0.22 | 10.00 | 91 | >10,000 | >10,000 |
| 29 | " | 1.67 | " | 9.44 | 96 | >10,000 | >10,000 |
| 30 | " | 2.22 | " | 8.89 | 94 | >10,000 | >10,000 |

The results demonstrate: 1) Bisamide didn't gel IOA/AA syrup when AA was lower than 2.22 parts (relative to 100 parts of IOA) within 24 hours; 2) After post added AA to a content to 11.1 parts (relative 100 parts of IOA), Bisamide provided excellent crosslinking as evidenced by the shear performance; 3) despite no thermal curing, excellent shear performance was obtained at room temperature. The results indicate that the Bisamide reacts quickly and completely at room temperature.

Examples 31-33

PSA Formulations with High Acid Polymer. (Mixing Sequence: Syrup+additional AA monomer+Bisamide)

Three syrups were prepared using procedures of U.S. Re 24906 (Ulrich), with the IOA/AA ratios indicated in Table 5. To these syrups additional AA monomers were added to a total AA content of 11.1 parts (relative to 100 parts of IOA). After mixing, Bisamide/IOA (20 wt %) solution was added so that Bisamide content was 0.22 parts (relative to 100 parts of IOA). The mixtures were mixed on a roller for 24 hours then knife coated between a piece PET substrate (Mitsubishi 3SAB) and silicone release liner (Siliconature) at 2 mil coating thickness. The samples were exposed to low intensity UV light for 400 mJ/cm².

Shear and 180° peel properties were tested after the tapes were left at a CT room for 24 hours. Results are summarized in Table 5. The conclusions were consistent with those of Table 4.

TABLE 5

Peel and shear properties of Bisamide crosslinked high acid containing PSA (Mixing sequence: syrup + AA monomer + Bisamide)

| | IOA | AA | Extra AA | Bisamide | Peel on glass | Shear on SS (min) | |
|---|---|---|---|---|---|---|---|
| Ex. | (parts) | (parts) | (parts) | (parts) | (N/dm) | RT | 70° C. |
| 31 | 100 | 1.11 | 10.00 | 0.22 | 91 | >10,000 | >10,000 |
| 32 | " | 1.67 | 9.44 | " | 100 | >10,000 | >10,000 |
| 33 | " | 2.22 | 8.89 | " | 96 | >10,000 | >10,000 |

Example 34

Bisamide Crosslinking in Tackified Low Acid Containing PSA

A syrup (IOA/IBoA/AA/IRG651: 100/23.8/1.25/0.25) was prepared using procedures of U.S. Re 24906 (Ulrich). Regalrez™ 6108 tackifier was added to the syrup at 30 parts level relative to 100 parts of IOA. The mixture was mixed on a roller overnight so the tackifier dissolved completely. To the tackified syrup copolymer was added Bisamide/IOA (20 wt %) solution so that the Bisamide solid was 0.25 parts (relative to 100 parts of IOA).

After mixing for 1 hour, the solution was coated on a piece of PET substrate (Mitsubishi 3SAB) at 2 mil coating thickness. The sample was cured with low intensity UV under $N_2$ flow. After left in a CT room for 24 hours, 180° peel and shear were tested. Results are shown in Table 6.

TABLE 6

Bisamide crosslinking performance in tackified low acid PSA.

| Example | Peel on PP (N/dm) | Shear (mins) at 70° C. |
|---|---|---|
| 34 | 63 | >10,000 |

Examples 35-37

A syrup of IOA/AA/IRG651 (100/1.6//0.21) was prepared using procedures of U.S. Re 24906 (Ulrich). AA (5.35 parts) was post-added to make a syrup of the above copolymer so that the final composition was IOA/AA/IRG651=100/6.95/0.21. To this syrup was added Foral™ 85 and Regalrez™ 6108 tackifiers at the ratios shown in Table 7. The total tackifier was 10.7 pph. To these mixtures were then added Bisamide/IOA (20 wt %) solution so that Bisamide was 0.21 parts relative to 100 parts of IOA.

The samples were put on a roller mixer for 3 hours then coated between a piece of PET (Mitsubishi 3SAB) and silicone liner (Siliconenature) at 2 mil coating thickness, exposed to low intensity UV for 600 mJ/cm$^2$, then left in a CT room 24 hours. Clear transparent tapes were obtained. Peel was tested on glass with a half inch tape strip. Shear was tested at 70° C. Results are summarized in Table 7.

TABLE 7

| ID | IOA (parts) | AA (parts) | Post add AA (parts) | Foral 85 | Regalrez 6108 | Bisamide (parts) | Peel (90"/min) on Glass (N/dm) | Shear on SS at 70° C. (min) |
|---|---|---|---|---|---|---|---|---|
| 35 | 100 | 1.6 | 5.35 | 10.7 | 0.0 | 0.21 | 84 | >10,000 |
| 36 | 100 | 1.6 | 5.35 | 7.5 | 3.2 | 0.21 | 86 | >10,000 |
| 37 | 100 | 1.6 | 5.35 | 3.2 | 7.5 | 0.21 | 95 | >10,000 |

Example 38

CX-100 Crosslinking in Tackified Low Acid Containing PSA

A syrup (IOA/IBoA/AA/IRG651: 100/23.8/1.25/0.25) was prepared. Regalrez™ 6108 tackifier was added to the syrup at 30 parts level relative to 100 parts of IOA. The mixture was mixed on a roller overnight so the tackifier dissolved completely. To it was added CX-100/IOA (20 wt %) solution so that the CX-100 solid was 0.06 parts relative to 100 parts of IOA. After mixed for 1 hour, the solution was coated on a piece of PET substrate (Mitsubishi 3SAB) at 2 mil thick. It was cured with low intensity UV under N$_2$ flow. After left in a CT room for 24 hours, 180° peel (on PP at 12"/min) and shear at 70° C. were tested. Results are shown in Table 8. As can be seen, excellent crosslinking was achieved in this low acid tackified formulation.

TABLE 8

| ID | Peel on PP (N/dm) | Shear (mins) at 70° C. |
|---|---|---|
| 38 | 61 | >10,000 |

Example 39-43

Bisamide and HDDA combination in crosslinking of tackified low acid containing PSA A syrup (IOA/AA/IRG651: 100/0.97/0.04) was prepared by mixing the monomers, degassing 10 minutes with N$_2$ flow and then exposing to low intensity UV until the viscosity reached about 7000 c.P. IBoA, additional Irgacure™ 651 and Regalrez™ 6108 tackifier was added to the syrup so the final composition of IOA/AA/IRG651/IBoA/Regalrez 6108 was 100/0.97/0.30/20.2/28.7. The mixture was mixed on a roller overnight. To it were added Bisamide and HDDA at the levels (relative to 100 parts of IOA) shown in Table 9. After mixing for 1 hour, the syrup was coated on a piece of kraft paper liner at 2 mil thick.

The syrup polymer was further cured with low intensity UV under N$_2$ flow. After 13 days in a CT room, back side 180° peel (on stainless steel at 12"/min) and shear at 70° C. (1.0"×0.5"×500 g) on stainless steel were tested. Results are shown in Table 9.

TABLE 9

Bisamide and HDDA combination crosslinking performance

| Ex. | Crosslinkers | | Shear (min) | Peel (N/dm) |
|---|---|---|---|---|
| | HDDA | Bisamide | | |
| 39 | 0.10 | — | 9 (Co) | 97 |
| 40 | 0.10 | 0.024 | 30 (Co) | 101 |
| 41 | 0.10 | 0.048 | 5298 (Co) | 101 |
| 42 | 0.10 | 0.072 | >10,000 | 101 |
| 43 | 0.10 | 0.096 | >10,000 | 97 |

Example 44-47

CX-100 and HDDA Combination in Crosslinking of Tackified Low Acid Containing PSA A syrup mixture IOA/AA/IRG651/IBoA/Regalrez was 100/0.97/0.30/20.2/28.7 was prepared according to Example 43. To it were added CX-100 and HDDA at the levels (relative to 100 parts of IOA) showing in Table 10. After mixing for 1 hour, the solution was coated on a piece of kraft paper liner at 2 mil thick. It was cured with low intensity UV under N$_2$ flow. After lone day in a CT room, 180° peel (on stainless steel at 12"/min) and shear at 70° C. (1.0"×0.5"×500 g) on stainless steel were tested. Results are shown in Table 10.

TABLE 10

| Ex. | Crosslinkers | | Shear (min) | Peel (N/dm) |
|---|---|---|---|---|
| | HDDA | CX-100 | | |
| 39 | 0.10 | — | 9 (Co) | 97 |
| 44 | 0.10 | 0.006 | 10 (Co) | 95 |
| 45 | 0.10 | 0.012 | 1402 (Co) | 100 |
| 46 | 0.10 | 0.024 | >10,000 | 98 |
| 47 | 0.10 | 0.036 | >10,000 | 87 |

As can be seen from Experiments 39-47, when combined with HDDA, the amount of Bisamide or CX-100 can be reduced greatly while maintaining good shear performance. By using lower amounts of polyaziridine crosslinkers such as Bisamide or CX-100, the risk of pre-mature gelation can be reduced.

What is claimed is:

1. A process for preparing a pre-adhesive copolymer composition comprising:
   a providing a syrup polymer composition comprising:
   1) a first component solute acid functional (meth)acrylate copolymer,
   2) a second component comprising at least one free-radically polymerizable solvent monomer comprising an acid functional monomer, and
   3) a polyfunctional aziridine crosslinking agent;
   b) wherein the component of the syrup polymer composition are combined for a time, and a temperature sufficient to react, and
   c) adding additional acid functional monomers.

2. The process of claim 1, wherein acid functional monomer is added in amount up to a total of 15 parts by weight, relative to 100 parts total (meth)acrylate ester.

3. The process of claim 1, wherein acid functional monomer is added in amounts of 1 to 10 parts by weight, relative to 100 parts total (meth)acrylate ester.

4. The process of claim 1 wherein the first component solute copolymer comprises:
   a) 100 parts by weight of an (meth)acrylic acid ester monomer units;
   b) 0.01 to less than 10 parts by weight of an acid functional monomer units;
   c) 0 to 25 parts by weight of a second, non-acid functional, polar monomer units;
   d) 0 to 5 parts vinyl monomer units.

5. The process of claim 1 wherein the solute copolymer comprises 0.01 to less than 5 parts by weight acid functional monomer units, based on 100 parts of an (meth)acrylic acid ester.

6. The process of claim 1 wherein the solute copolymer comprises 0.1 to less than 1 parts by weight acid functional monomer units, based on 100 parts of an (meth)acrylic acid ester.

7. The process of claim 1 wherein the solvent monomer component comprises:
   1) 100 parts by weight of an (meth)acrylic acid ester monomers;
   2) 0.01 to less than 10 parts by weight of an acid functional monomers;
   3) 0 to 25 parts by weight of a second, non-acid functional, polar monomers; and
   4) 0 to 5 parts vinyl monomers.

8. The process of claim 1 wherein solvent monomer component comprises 100 parts of one or more (meth)acrylate ester monomers, and 0.01 to less than 5 parts by weight of acid functional monomers.

9. The process of claim 1 wherein solvent monomer component comprises 100 parts of one or more (meth)acrylate ester monomers, and 0.1 to less than 1.5 parts by weight of acid functional monomers.

10. The process of claim 1 comprising 0.005 to 5.0 parts by weight of polyaziridine crosslinking agent, relative to 100 parts of the solute copolymer.

11. The process of claim 1 wherein the syrup polymer composition having less than 5 pbw of dead polymer after step b).

12. The process of claim 1 wherein the ratio of the molar equivalents of aziridine groups of the polyfunctional aziridine crosslinking agent to the number molar equivalents of carboxylic acid groups of the solute polymer is between about 1:5 to 1:50.

13. The process of claim 1 wherein the polyfunctional aziridine crosslinking agent comprises a bisamide crosslinking agent.

14. The process of claim 13 wherein the bisamide crosslinking agent is of the general formula:

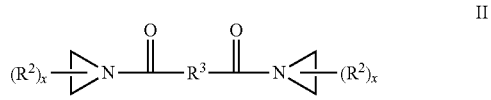

Wherein
$R^3$ is a (hetero)hydrocarbyl group;
$R^2$ is an H or $C_1$-$C_4$ alkyl group,
x is 0, 1 or 2.

15. The process of claim 13 wherein the bisamide crosslinking agent is of the formula:

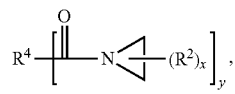

wherein
$R^4$ is a hydrocarbyl group having a valency of y,
$R^2$ is an H or $C_1$-$C_4$ alkyl group,
y is at least 2,
x is 0, 1 or 2.

16. The process of claim 1 wherein the polyaziridine crosslinking agent is of the formula:

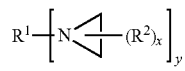

wherein
$R^1$ is a (hetero)hydrocarbyl group,
$R^2$ is an H or $C_1$-$C_4$ alkyl group,
x is 0, 1 or 2, and
y is 2 to 4.

17. The process of claim 1 wherein the polyaziridine crosslinking agent is of the formula:

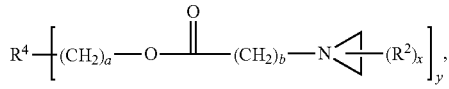

wherein
$R^4$ is a hydrocarbyl group having a valency of y,
$R^2$ is an H or $C_1$-$C_4$ alkyl group,
y is at least 2,
x is 0, 1 or 2; and
each of a and b are independently 0, 1 or 2.

18. The process of claim 1 further comprising 0.01 to 5 parts of a multifunctional (meth)acrylate crosslinking agent based on 100 parts total monomers.

19. The process of claim 1, comprising the further step of d) free radically polymerizing the syrup polymer composition in the presence of a free radical initiator.

20. The process of claim 19 comprising the step of photopolymerizing the syrup polymer composition.

\* \* \* \* \*